April 26, 1966   P. M. HANKISON ETAL   3,247,681
GAS CLEANING APPARATUS
Filed April 2, 1964   3 Sheets-Sheet 1

INVENTORS
Paul M. Hankison &
William Foster Walker
BY

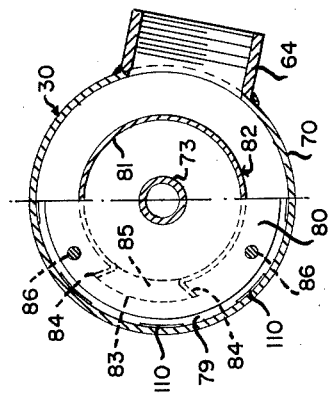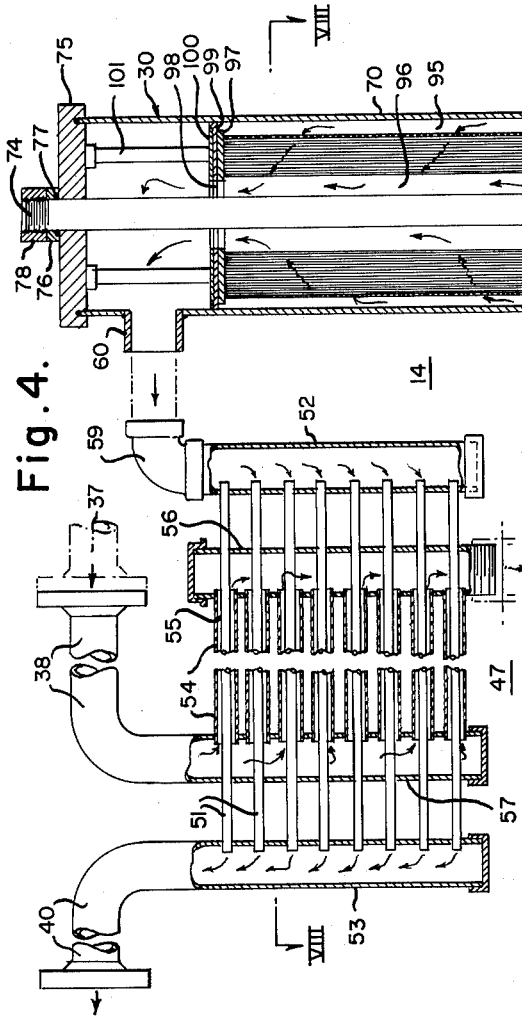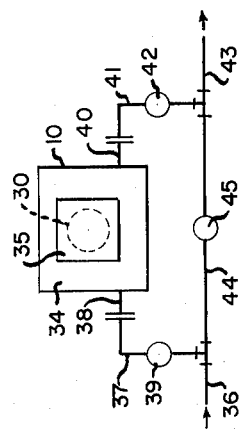

April 26, 1966 P. M. HANKISON ETAL 3,247,681
GAS CLEANING APPARATUS
Filed April 2, 1964 3 Sheets-Sheet 3

INVENTORS
Paul M. Hankison &
William Foster Walker

United States Patent Office 3,247,681
Patented Apr. 26, 1966

3,247,681
GAS CLEANING APPARATUS
Paul M. Hankison, Peters Township, Washington County, and William Foster Walker, Bethel Borough, Pa., assignors to Hankison Corporation, Canonsburg, Pa., a corporation of Pennsylvania
Filed Apr. 2, 1964, Ser. No. 356,921
5 Claims. (Cl. 62—317)

This invention relates to apparatus for cleaning gas, such as compressed air, to remove moisture, vapor and/or dirt therefrom. More particularly, this invention pertains to larger capacity devices providing external tube-in-tube coils at least for condensation and a relatively small pressure vessel for separation of suspended and entrained substances.

In devices embodying this invention compressed gas including air from a compressor, or receiver, or other pressure source thereof, may, without substantial drop in pressure be fully cleaned by condensing out of the gas while flowing, moisture, condensible vapors including oil vapors, and by separating any entrained or suspended mist, particles of dirt, scale and/or other substance. Preferably, gas-to-gas indirect heat exchange is included in a further external coil section so that the clean outgoing gas may, if desired, be at a temperature approximating that of the incoming uncleaned gas. And in such embodiments, a much smaller and lower cost ASME coded pressure vessel may be utilized than would be the case if the entire processing circuit were included within a pressure vessel as has heretofore been a common practice. And, in embodiments of this invention, the over-all pressure drop remains relatively low even though there are larger throughputs; efficient separation means are provided for the removal of moisture, by which term as used herein may be included mist, fog, droplets and/or condensible vapor; and means are provided for changing renewable elements, when utilized, such as a fibrous filter for separation of dirt, scale and any other suspended solids and fluids. Embodiments of this invention lend themselves to being preassembled in packaged unit form and may be insulated in situ in a cabinet in which they may be mounted when so packaged.

Other objects, features and advantages of this invention will be apparent from the following description and the accompanying drawings, which are illustrative only, in which FIGURE 1 is a view in front elevation of one embodiment unit of this invention mounted in a cabinet with a part of the front wall thereof broken away to better illustrate some of the construction;

FIGURE 3 is a schematic top view of such embodiment unit showing it connected in the flow line of a gas under pressure which normally is to be cleaned by such embodiment unit;

FIGURE 4 is a schematic layout view of the gas cleaning apparatus comprising the illustrated embodiment of this invention;

FIGURE 7 is a plan view partly in cross section taken generally on line VII—VII of FIGURE 4;

Figure 6:
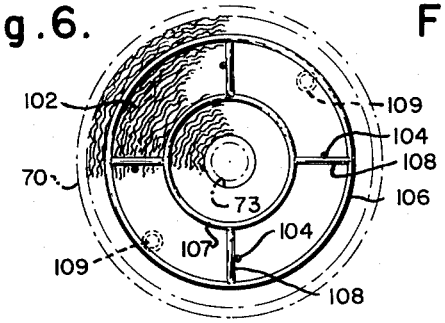
FIGURE 6 is a plan view of such modified portion.
Figure 5:
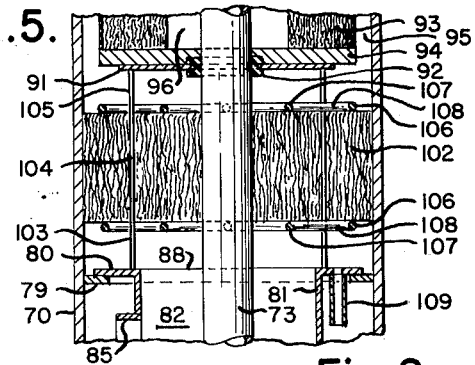
FIGURE 5 is a side view illustrating a modified moisture separator portion suitable for use in such embodiment.
Figure 1:
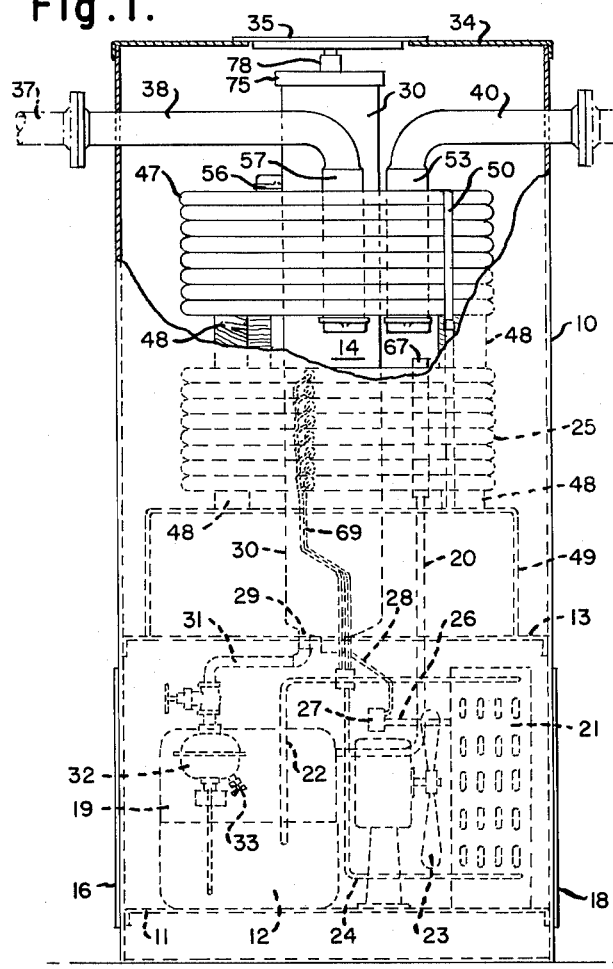
Figure 2:
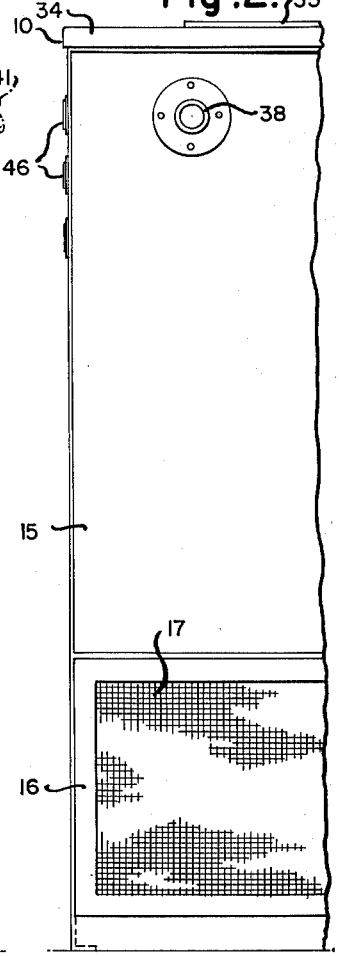
FIGURE 2 is a partial side view of the embodiment shown in FIGURE 1.
Figure 8:
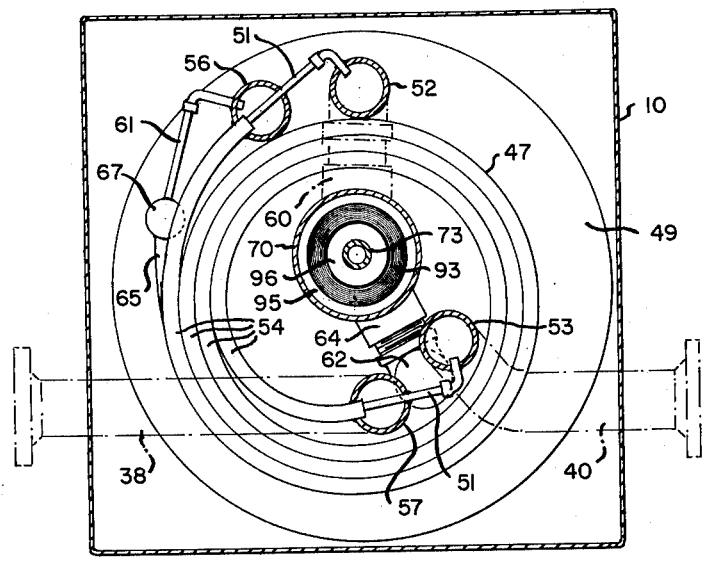
FIGURE 8 is a plan view partly in cross section taken generally on the level of line VIII—VIII of FIGURE 4 showing an upper exterior coil section in assembled relation to associated parts.
Figure 9:
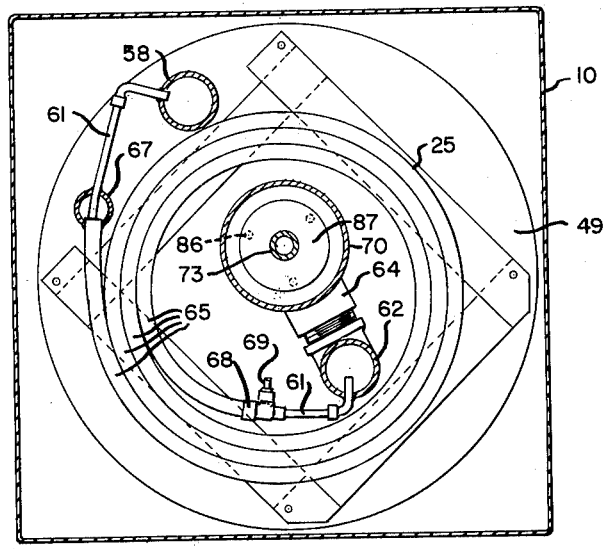
FIGURE 9 is a plan view partly in cross section taken generally on the line IX—IX of FIGURE 4 showing a lower exterior coil section in assembled relation to associated parts.

Referring to the drawing figures other than FIGURES 5 and 6, a rectilinear steel cabinet 10 may be provided with a lower shelf 11 for a refrigerating unit 12 and an upper shelf 13 for a gas cleaning unit 14 comprising one embodiment of this invention. Cabinet 10 may be provided with a side opening upper panel 15 and a lower panel 16. Panel 16 principally comprises a grating or screen 17 for flow of air through the lower compartment between the lower and upper shelves 11 and 13, the other side of the lower compartment being provided with a screen panel 18 similar to panel 16. For optimum control of the evaporation and condensation cycle of a suitable refrigerant such as a selected Freon, cabinet 10 and its contents preferably are placed in a location where the temperature does not go below freezing, or substantially above 100° F., although other locations may be selected when particular precautions are taken.

Refrigerant unit 12 operates in a known manner, one such having been described in Patent No. 3,063,259 held in common ownership herewith. Thus, vaporized refrigerant is returned to compressor 19 through a return line 20, is increased in pressure and sent to a radiator 21 through a discharge line 22 where a selected portion is condensed by the air blown across the coil turns of the radiator by a fan 23. The selected condensed portion of the refrigerant passes through pipe capillaries 24 to the condenser-evaporator section 25, the remainder of the refrigerant not required in section 25 being returned through a bypass 26 in accordance with a proportioning valve 27 responsive to a pressure sensing capillary pipe 28 sensing the pressure on the refrigerant side of section 25 to keep the available quantity of chilling refrigerant in section 25 proportional to the flow of gas therethrough on the gas side in order to condense all condensible vapors in such gas without freezing them so that they will run out through a drain 29 in the bottom of a relatively small pressure vessel 30. Drain 29 is connected by a pipe 31 having a valve therein to a pressure trap 32, which may be made in accordance with Patent No. 2,999,509 in common ownership herewith. Trap 32 will automatically discharge the collected condensate when it reaches a certain level, or a petcock 33 may be used for a blowdown discharge at any other time desired.

Cabinet 10 is provided with a cover 34 having a central plate 35 removably affixed thereto immediately above the openable end of pressure vessel 30. When unit 14 has been installed and fastened in the upper compartment between shelf 13 and cover 34 and cover 34 is fixed in place with the plate 35 removed, all of the interior of the upper compartment and all of the interstices of unit 14 may be filled with polystyrene insulation, or with polyurethane foam, up to the top of the upper compartment, after which plate 35 is replaced. Thereby, all of the exterior surface portions of unit 14 are effectively insulated. After shipment of cabinet 10 and its contents to a place of use, a supply pipe 36 of a gas under pressure, which is to be cleaned, is connected to an inlet branch pipe 37 coupled in turn to an inlet pipe 38, a valve 39 being provided in branch 37. Similarly, an outlet pipe from unit 14 may be coupled to a clean gas outlet branch pipe 41 having a valve 42 and connected to a clean gas supply pipe 43 to supply clean gas under predetermined pressure and temperature by virtue of the use of this invention. Normally, a bypass pipe 44 is provided between pipes 36 and 43 with a normally closed bypass valve 45 therein, to place this invention into operative connection with a compressor, compressor receiver or other source of gas under pressure requiring cleaning to be supplied through pipe 36. Clean outgoing gas entering pipe 43 from branch 41 is conducted to the place where it will be used, without likelihood of condensation or fouling caused thereby, in view of its having been cleaned by unit 14. Gauges, lights and/or other means 46 may be used to indicate requisite information as to temperature, pressure, flow, etc. Lifting eyes may be provided for cabinet 10 and its contents when the pipes 38 and 40 and respective power connections are disconnected so that it may be readily moved as desired, or the packaged unit may be handled instead by a fork or pallet lifting device.

Combinative unit 14 comprises connected elements including pressure vessel 30 firmly fixed to shelf 13 by welding or otherwise, lower tube-in-tube external coil section 25 and upper tube-in-tube external coil heat exchanger section 47, such sections being spaced by spacers 48 and also firmly fixed in cabinet 10 to a base 49 and each other by holding straps 50 and associated connections.

Section 47 comprises a plurality of tiers of inner tubes 51 defining inner passageways, the respective ends of such tubes being connected to and communicating with the respective interiors of vertical manifolds 52 and 53, which may be made of pipe having the lower ends thereof capped. Section 47 also comprises outer pipes 54 in concentric relation to inner pipes 51, respectively, to define a like plurality of parallel, annular passageways 55. The ends of the outer pipes are connected to and communicate with the interiors of vertical manifolds 56 and 57, respectively. The lower end of manifold 57 is capped and the upper end comprises a continuation of inlet pipe 38, just as the upper end of manifold 53 is continued by the outlet clean gas pipe 40. Manifold 56 is capped at its upper end and is continued downwardly of section 47 by a lower vertical manifold 58. The upper end of manifold 52 is provided with an elbow 59 for connection by a union or nipple to outlet fitting 60 of pressure vessel 30. In the case of manifolds 56 and 57, the inner pipes 51 alone pass through one side of the walls of such manifolds 56 and 57, where they are sealed around the outside of such inner pipes. Hence, it will be seen that section 47 is an external coil of many parallel turns in a plurality of tiers, with relatively low pressure drop between the respective ends of the inner pipes and of the outer pipes, respectively, for indirect gas-to-gas heat exchange through the metal walls of the inner pipes which preferably are of a highly conductive metal such as copper or brass. The respective ends of the outer pipes also are sealed around the outside thereof where they make connection with their respective manifolds so that the system is sealed against leakage substantially to retain the system pressure in the course of the cleaning of the gas passing therethrough.

A somewhat like construction and arrangement with corresponding low pressure drop and, preferably, countercurrent flow is provided in the condenser-evaporator section 25. Therein, inner pipes 61, defining inner passageways, have their respective ends connected to and communicate with the interior of manifolds 58 and 62. The lower end of manifold 58 is capped and the upper end of manifold 62 is capped. Gas discharged through the lower end of manifold 62 passes through an elbow 63 and by means of a nipple or union on the same level is connected to an inlet fitting 64 in the lower part of vessel 30. Outer pipes 65 surround the inner pipes 61 in concentric relation and define parallel annular passageways 66, through which the condensing refrigerant passes, in a plurality of superposed tiers. The outlet ends of outer pipes 65 are connected to and communicate with the interior of a vertical manifold 67 having a return pipe 20 leading from the bottom thereof to compressor 19 as described above. The other ends of the respective pipes 65 are capped by caps 68 to seal those ends around the inner pipes 61, a plurality of capillary tubes 69 being respectively connected to and used to conduct liquefied refrigerant from pipes 24 in parallel streams to the inlet ends to the respective passageways 66. Here again, the provision of parallel turns of the tube-in-tube coils in each tier and the countercurrent parallel flow which occurs on each side, on the gas and refrigerant sides of each tier, yields a relatively low pressure drop and trouble-free component for the system with efficient chilling of the gas to condense its condensibles, and evaporation of refrigerant, through the wall of the inner pipes 61 along the lengths thereof. The outer pipes extend substantially the entire lengths of the inner pipes, respectively. The metal of at least the inner pipes 61 may be made of heat conductive material such as copper or brass. Further, while in the illustrated embodiment, the refrigerant goes through the annular passageways 66 out of contact with the gas which goes through the inner passageways within the pipes 61, there may, if desired, be a reversal of the respective passageways used for those respective fluids, and the same is true of the passageways in heat exchange section 47 for those embodiments in which it is desired to use such a heat exchange section. Still further, the sections may be reversed in their respective superadjacent positions illustrated, or placed side-by-side, whether or not more than one pressure vessel is used in the circuit selected for a practice of this invention.

Pressure vessel 30 comprises a cylindrical shell built to withstand the pressure of the gas passing therethrough under the applicable safety code, or codes. It is closed at the bottom by means of a head 71 through which an opening 72 leads to a drain fitting 29 welded thereto. The head is also pierced for a center column 73 which extends along the vertical axis of the vessel and terminates at its upper end in a threaded portion 74. An upper head 75 with a seal ring gasket fits over the upper edge of shell 70 and a washer 76 with a sealing O-ring 77 is fastened by a nut 78 when the pressure vessel 30 is assembled to seal the space and parts enclosed therein. The vessel 30 extends upwardly through the eye of the respective coil sections 25 and 47, making a relatively compact, lower-cost unit.

An internal flange 79 is provided in the lower part of shell 70 above fitting 64 to support a separator 82 having an exterior annular flange 80 affixed to a cylindrical wall 81, open at the top and bottom thereof and having an upwardly extending opening 83 facing away from fitting 64. The vertical edges of opening 83 are provided with reentrant outturning lips 84 and an arcuate lintel 85 to improve the separation process. An annular baffle 87 is provided with three posts 86 which space it above the central opening 88 in flange 80, the outside diameter of baffle 87 preferably being larger than the diameter of opening 88. A channel gasket 89 seals baffle 87 around column 73 and is spaced by a spacer 90 from a support 91 also sealed around column 73 by a channel gasket 92, the plate 91 being the support for the bottom of a filter cartridge element 93 having its lower end 94 pressing thereon in sealed relation to column 73 so that all gas rising in shell 70 must flow into the space 95 between shell 70 and the outside of the filter. The filter cartridge 93 is made with imperforate annular heads and a large surface stiff wire mesh structure covered with a suitable fibrous filtering material, such as muslin or other substance, element 93 defining a central space 96 inside of the filtering medium so that filtered gas can rise in such center 96 from the final stage of its cleaning passing upwardly through the open center 98 of annular head 97 and openings registering therewith in a resilient cup gasket 99 and an annular retainer plate 100 to hold the gasket in place. Spacer rods 101 positioned at angular distances around the center of the underside of cover 75, press retainer 100 in place and fix the respective relative positioning of the members inside vessel 30 when that vessel is closed by the tightening of nut 78. Space 96 communicates with the space around the rods 101 and in turn with the interior of outlet fitting 60 leading to the interior of manifold 52.

In the modification of FIGURES 5 and 6, baffle 87 may be replaced by a circular disc of stainless steel mesh 102 filling the entire internal cross section of shell 70 a distance above flange 80 represented by the height of legs 103. Legs 103 are the lower portions of vertical rods 104 spaced 90° apart around an intermediate circumference, the upper ends 105 of rods 104 taking the place of spacer cylinder 90 to support annular plate 91 in sealed relation to column 73, the structure remaining otherwise unchanged, if desired. Concentric outer metal rings 106 and inner metal rings 107 joined by radial members 108 comprise the bottom and top retainers for disc 102, such disc being open through the center for the passage of column 73. Rods 104 are soldered or welded to members 108 partway along the length thereof to make a self-contained demisting unit which also may readily be removed and cleaned as and when desired. Flange 80 may also be provided as shown in FIGURES 5 and 6 with drain tubes 109, to improve drainage of moisture downwardly toward the bottom of shell 70 so that it may pass out through openings 72 and drain 29. Or, as shown in FIGURE 7, flange 79 may be provided with arcuate weep slots 110 along the inside of shell 70 for a like purpose. Generally, the pressure outwardly of wall 81 below flange 79 will be somewhat lower due to velocity and will act to intensify the downward drainage of moisture separated from the gas rising in vessel 30.

In an operation of the illustrated embodiment, let it be assumed that compressed air in a quantity of 500 standard cubic feet per minute at a pressure of 100 pounds per square inch gauge and a temperatre of 100° F. is saturated with moisture and contains oil vapors, and suspended dirt to be removed. Such dirty gas enters inlet pipe 38 from supply line 36 and branch 37, passes through the passageways 55 in parallel and in countercurrent heat exchange relation with cleaned air going through the inner passageways inside of inner pipes 51. Such cleaned air in one practice of this invention will then enter manifold 53 and leave through outlet pipe 40 at, say, 95 pounds per square inch gauge and a temperature of at least 80° F., with virtually all moisture, vapors and dirt removed therefrom so that such cleaned air may be used virtually at a temperature nearly as low as a water freezing temperature without condensation of moisture occurring in that cleaned air.

To return to the illustrative operation, the dirty air after heat exchange in section 47 exits in a cooled state through manifolds 56 and 58 and enters the inner passageways within the inner pipes 61 in section 25. Therein, the cooled dirty air is chilled by the refrigerant passing in countercurrent flow through the annular passageways 66, causing the condensation of condensible materials in the cooled dirty gas such as water and oil vapors. Such air with the condensate flows into manifold 63 and the condensate drains down and out through opening 72 and drain 29 for periodic emptying, normally, from the system as described above. Evaporated refrigerant leaves the annular passageways 66 and flows into the manifold 67 whence it passes by pipe 20 back to compressor 19 of refrigeration unit 12 for conditioning and returns in the needed quantity at the time being.

The cooled air normally will have entrained and/or suspended moisture and dirt as it enters vessel 30 through inlet fitting 64. By virtue of changes in velocity and/or directions of flow of the gas in the zone of separator 82 and baffle 87, or through the demister disc 102, as indicated somewhat by arrows on FIGURE 4, the continued entrainment of such moisture is markedly inhibited, some dirt being taken out at the same time and running off with the collected moisture to the bottom of shell 70 for removal again through opening 72 and drain 29. At this juncture, the gas, which by now has been cooled, had condensibles condensed and been demoisturized, then passes into space 95 whence it passes through the filtering material of element 93 to remove remaining moisture and dirt. The cooled clean air then rises in space 96 and passes out through outlet fitting 60 to enter manifold 52 and the inner passageways within pipes 51 for countercurrent heat exchange, as previously described, to yield cleaned air at predetermined pressure and temperature exiting from outlet pipe 40.

Parts of the illustrated embodiment may readily be cleaned and/or replaced as in the case of filter cartridge 93. Thus, after bypassing the embodiment by closing the valves 39 and 42, opening valve 45, depressurizing unit 14 and then removing nut 78, head 75 can be taken off and filter element 93 removed upwardly for cleaning and reinsertion, or for replacement thereof by a new filter unit. At the same time, if demister 102 has been used instead of baffle 87 it too can be taken out and washed before being dried and replaced. Following such reinsertion head 75 is put back and tightened and pressure again admitted to unit 14 at a suitable rate until it receives the full throughput upon the closing of by-pass valve 45.

Various changes may be made in details of the illustrated embodiment, other embodiments may be provided and other respective elements of the combination disclosed may be used, or other changes made, without departing from the spirit of this invention, or the scope of the appended claims.

What is claimed is:

1. Gas cleaning apparatus comprising, in combination, a heat exchanger section having a plurality of tiers of superposed tube-in-tube flat helical coil branches, each of said coil branches comprising an inner tube and an outer tube defining a first inner passageway and a first outer passageway, a first manifold connected to the respective inlet ends of said first inner passageways, a second manifold connected to the respective outlet ends of said first inner pasageways, a third manifold connected to the respective inlet ends of said first outer passageways, a fourth manifold connected to the respective outlet ends of said first outer passageways for respective flows therethrough in parallel arrangement in separated sealed relation to each other and the ambient atmosphere, said second manifold being further connected to a clean gas outlet means, said third manifold being further connected to a gas inlet means, a condenser-evaporator section having a plurality of tiers of superposed tube-in-tube flat helical coil branches, each of said coil branches comprising an inner tube and an outer tube defining a second inner passageway and a second outer passageway, a fifth manifold connected to the respective inlet ends of said second inner passageways, a sixth manifold connected to the respective outlet ends of said second inner passageways, capillary tubes respectively connected to the respective inlet ends of said second outer passageways, a seventh manifold connected to the respective outlet ends of said second outer passageways for respective flows therethrough in parallel arrangement in separated sealed relation to each other and the ambient atmosphere, said fourth and fifth manifolds being substantially a common manifold, said sections being positioned in superadjacent relation one to the other and presenting a registering central open space through both of said sections, a pressure vessel disposed in said open space and connecting the sixth manifold with the first manifold, means in said pressure vessel for separating and filtering moisture and dirt from gas passing therethrough, means to supply gas to be cleaned under pressure to the gas inlet means of said heat exchanger section and means to supply refrigerant to said capillary tubes in said condenser-evaporator section to condense condensible vapors from the gas passing through said condenser-evaporator section prior to the passing of said gas into said pressure vessel through said sixth manifold.

2. Gas cleaning apparatus comprising, in combination, a tube-in-tube external coil heat exchanger section providing respective passageways for respective flows of clean gas and unclean gas therethrough in separate sealed relation to each other and the ambient atmosphere and having clean gas inlet means, clean gas outlet means, unclean gas inlet means and unclean gas outlet means, a tube-in-tube external coil condenser-evaporator section providing respective passageways for respective flows of gas and refrigerant therethrough in separate sealed relation to each other and the ambient atmosphere and having gas inlet means, gas outlet means, refrigerant inlet means and refrigerant outlet means, a pressure vessel positioned adjacent said sections and connecting the gas outlet means of said condenser-evaporator section to the clean gas inlet means of said heat exchanger section, the gas inlet means of said condenser-evaporator section being substantially directly connected to the unclean gas outlet means of said heat exchanger, means in said pressure vessel for separating and filtering moisture and dirt from gas passing therethrough, means to supply gas to be cleaned under pressure to the unclean gas inlet means of said heat exchanger section and means to supply refrigerant to the refrigerant inlet means of said condenser-evaporator section to condense condensible vapors from the gas passing through said condenser-evaporator section prior to the passing of said gas into said pressure vessel through the gas outlet means of said condenser-evaporator section.

3. Gas cleaning apparatus as claimed in claim 2, wherein said sections are positioned in superadjacent relation one to the other and present a registering central open space through both of said sections and said pressure vessel is disposed in said open space.

4. Gas cleaning apparatus comprising in combination, a tube-in-tube external condenser-evaporator section providing respective passageways for respective flows of gas and refrigerant therethrough in separate sealed relationship to each other and to the ambient atmosphere and having gas inlet means, gas outlet means, refrigerant inlet means and refrigerant outlet means, a pressure vessel positioned adjacent said section and connecting said gas outlet means to a clean gas outlet, said section being positioned exteriorly of and displaced from said pressure vessel, means in said pressure vessel for removing moisture and dirt from gas passing therethrough, means for supplying gas to be cleaned under pressure to the gas inlet means of said section, and means for supplying refrigerant to the refrigerant inlet means of said condenser-evaporator section to condense condensable vapors from the gas passing through said section prior to the gas passing into said pressure vessel through the gas outlet means of said section, said section having an open space therethrough, and said pressure vessel being disposed in said open space.

5. The combination according to claim 4 wherein said condenser-evaporator section comprises a number of juxtaposed, tube-in-tube heat exchange coils defining a central opening through said section and said pressure vessel is disposed in said opening.

References Cited by the Examiner
UNITED STATES PATENTS

| | | | |
|---|---|---|---|
| 2,281,168 | 4/1942 | Paget | 165—66 |
| 2,745,552 | 5/1956 | Bruggeman et al. | 165—66 X |
| 2,762,209 | 9/1956 | Bennett | 165—143 X |
| 2,790,507 | 4/1957 | Hankison | 55—268 X |
| 3,063,259 | 11/1962 | Hankison et al. | 55—268 X |

ROBERT A. O'LEARY, *Primary Examiner.*

W. E. WAYNER, *Assistant Examiner.*